(12) United States Patent
Larson et al.

(10) Patent No.: US 9,398,126 B2
(45) Date of Patent: Jul. 19, 2016

(54) PULSED INPUT PUSH-TO-TALK SYSTEMS, METHODS AND APPARATUS

(71) Applicant: Twisted Pair Solutions, Inc., Seattle, WA (US)

(72) Inventors: David Larson, Seattle, WA (US); Paul Peavyhouse, Bothell, WA (US); Derick Clack, Seattle, WA (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 329 days.

(21) Appl. No.: 13/795,524

(22) Filed: Mar. 12, 2013

(65) Prior Publication Data

US 2013/0272559 A1 Oct. 17, 2013

Related U.S. Application Data

(60) Provisional application No. 61/624,204, filed on Apr. 13, 2012.

(51) Int. Cl.
| | | |
|---|---|---|
| *H04R 1/10* | (2006.01) | |
| *H04M 1/00* | (2006.01) | |
| *H04M 1/05* | (2006.01) | |
| *H04M 1/60* | (2006.01) | |
| *H04M 1/725* | (2006.01) | |

(52) U.S. Cl.
CPC .............. *H04M 1/05* (2013.01); *H04M 1/6058* (2013.01); *H04M 1/72527* (2013.01); *H04R 1/1041* (2013.01)

(58) Field of Classification Search
None
See application file for complete search history.

(56) References Cited

U.S. PATENT DOCUMENTS

| | | |
|---|---|---|
| 6,922,473 B2 | 7/2005 | Turnbull |
| 6,950,627 B2 | 9/2005 | Vicari |
| 6,979,231 B2 | 12/2005 | Shinohara |
| 7,224,992 B2 | 5/2007 | Patino et al. |
| 7,241,179 B2 | 7/2007 | Chennakeshu |

(Continued)

FOREIGN PATENT DOCUMENTS

| | | |
|---|---|---|
| CN | 201774654 U | 3/2011 |
| EP | 1 825 599 B1 | 2/2009 |

(Continued)

OTHER PUBLICATIONS

Howtodothings.com, "How to Wire a 4 Connector Audio Jack," Retrieved from URL=http://www.howtodothings.com/electronics/how-to-wire-a-4-connector-ausio-jack on Apr. 24, 2012, 3 pages.

(Continued)

*Primary Examiner* — Regina N Holder
(74) *Attorney, Agent, or Firm* — Daniel R. Bestor

(57) ABSTRACT

A push-to-talk headset can include one or more user-actuatable switches, user-actuatable adjustment devices or the like that are electrically coupled to a pulse generator circuit. Responsive to detected state transitions of the one or more user-actuatable switches, user-actuatable adjustment devices or the like, a number of signals comprising a number of pulses may be communicated to a portable electronic device communicably coupled to the push-to-talk headset. At least a first of these signals having a first number of pulses may be used to place the portable electronic device in a push-to-talk mode. At least a second of these signals having a second number of pulses may be used by the operating system to remove the portable electronic device from the push-to-talk mode.

25 Claims, 6 Drawing Sheets

(56) References Cited

U.S. PATENT DOCUMENTS

| | | | |
|---|---|---|---|
| 7,643,642 | B2 | 1/2010 | Patino et al. |
| 7,769,187 | B1 | 8/2010 | Farrar et al. |
| 7,774,030 | B1 | 8/2010 | Klein |
| 7,813,696 | B2 | 10/2010 | Kim |
| 7,818,037 | B2 | 10/2010 | Lair et al. |
| 7,869,608 | B2 | 1/2011 | Sander et al. |
| 7,885,615 | B2 | 2/2011 | Rao et al. |
| 8,019,096 | B2 | 9/2011 | Sander et al. |
| 8,095,081 | B2 | 1/2012 | Vance |
| 8,290,171 | B1 | 10/2012 | Helfrich et al. |
| 8,497,778 | B1 | 7/2013 | Martin |
| 2002/0107053 | A1 | 8/2002 | Petez et al. |
| 2003/0008564 | A1 | 1/2003 | Lebron |
| 2004/0022395 | A1 | 2/2004 | Turnbull |
| 2005/0079885 | A1* | 4/2005 | Patino ............... H04M 1/05 455/518 |
| 2006/0050917 | A1 | 3/2006 | Skillicorn et al. |
| 2006/0229108 | A1 | 10/2006 | Cehelnik |
| 2007/0178947 | A1* | 8/2007 | Kim ............... 455/575.2 |
| 2007/0225049 | A1 | 9/2007 | Andrada |
| 2008/0200208 | A1 | 8/2008 | Llanos et al. |
| 2009/0136058 | A1 | 5/2009 | Choi et al. |
| 2009/0180659 | A1 | 7/2009 | Sander et al. |
| 2009/0227298 | A1 | 9/2009 | Fukunaga |
| 2009/0296952 | A1 | 12/2009 | Pantfoerder et al. |
| 2009/0307511 | A1 | 12/2009 | Fiennes et al. |
| 2010/0054493 | A1 | 3/2010 | Lin et al. |
| 2011/0007929 | A1 | 1/2011 | Rabu et al. |
| 2011/0099298 | A1 | 4/2011 | Chadbourne et al. |
| 2011/0116643 | A1 | 5/2011 | Tiscareno et al. |
| 2011/0116646 | A1 | 5/2011 | Sander et al. |
| 2011/0116647 | A1 | 5/2011 | Terlizzi et al. |
| 2011/0116675 | A1 | 5/2011 | Terlizzi et al. |
| 2011/0116747 | A1 | 5/2011 | Terlizzi et al. |
| 2011/0116750 | A1 | 5/2011 | Terlizzi et al. |
| 2011/0116751 | A1 | 5/2011 | Terlizzi et al. |
| 2011/0188669 | A1 | 8/2011 | Lu |
| 2011/0227631 | A1 | 9/2011 | Yamkovoy et al. |
| 2011/0263303 | A1 | 10/2011 | Lowles et al. |
| 2011/0300751 | A1 | 12/2011 | Wittenberg et al. |
| 2012/0214549 | A1 | 8/2012 | Philbin |
| 2013/0195283 | A1 | 8/2013 | Larson et al. |

FOREIGN PATENT DOCUMENTS

| | | |
|---|---|---|
| JP | 05167660 A | 7/1993 |
| KR | 10-2006-0083737 A | 7/2006 |
| KR | 20090021431 A | 3/2009 |
| TW | I255662 B | 5/2006 |
| WO | 99/57937 A1 | 11/1999 |
| WO | 2012/024775 A1 | 3/2012 |

OTHER PUBLICATIONS

International Search Report and Written Opinion, mailed Jun. 27, 2013, for International Application No. PCT/US2013/030568, 11 pages.

International Search Report and Written Opinion, mailed May 15, 2013, for International Application No. PCT/US2013/024464, 11 pages.

Larson et al., "Enabling PTT on Smart Phones Using Input Pulses," U.S. Appl. No. 61/624,204, filed Apr. 13, 2012, 18 pages.

Australian Patent Examination Report No. 1 Dated Mar. 20, 2015.

"IEEE 1394 (Firewire®)," Wikipedia, the free encyclopedia, Retrieved from the Internet URL: https://en.wikipedia.org/wiki/IEEE_1394, on Mar. 8, 2016, pp. 1-13.

"Phone connector (audio)," Wikipedia, the free encyclopedia, Retrieved from the Internet URL: http://en.wikipedia.org/wiki/TRS_connector, on Mar. 8, 2016, pp. 1-16.

"Push-to-talk," Wikipedia, the free encyclopedia, Retrieved from the Internet URL: http://en.wikipedia.org/wiki/Push_to_talk, on Mar. 8, 2016, pp. 1-4.

Extended European Search Report and Opinion mailed Oct. 30, 2015, for corresponding European Patent Application No. 13775889.2 filed Mar. 12, 2013.

International Preliminary Report on Patentability for corresponding International Patent Application No. PCT/US2013/024464, mailed on Aug. 5, 2014.

Non-Final Office Action mailed Sep. 24, 2014, in U.S. Appl. No. 13/364,161, Larson, D et al., filed Feb. 1, 2012.

International Preliminary Report on Patentability for corresponding International Patent Application No. PCT/US2013/030568, mailed on Oct. 14, 2014.

Notice of Acceptance mailed Jul. 3, 2015, for corresponding Australian Patent Application No. 2013246406, filed Mar. 12, 2013.

\* cited by examiner

PULSED INPUT PUSH-TO-TALK SYSTEMS, METHODS AND APPARATUS

BACKGROUND

1. Technical Field

This disclosure generally relates to combination headsets containing speakers and microphones.

2. Description of the Related Art

Over a relatively short period of time, the cellular telephone has grown from a dedicated communication device to a multipurpose device having a surprising number of functions controlled using an architecture and processor closely resembling a dedicated computing device—giving birth to the term "smartphone." Current smartphones have either a tip-ring-sleeve (referred to as a "TRS" jack) or a tip-ring-ring-sleeve (referred to as a "TRRS" jack) to accommodate audio input and/or audio output using external devices other than the speaker(s) and microphone(s) integrated into the body of the smartphone. These TRS and TRRS jacks are generally provided as either a 2.5 mm diameter or a 3.5 mm diameter female jack placed in an accessible area on an exterior surface of the smartphone body.

Although the TRRS jack is intended to provide two speaker circuits and one microphone circuit, additional functionality may be gleaned from the jack by configuring the smartphone hardware or operating system to recognize various signals transmitted to the operating system via the TRRS jack. Such hardware or operating system modifications are frequently device or platform specific and are somewhat limited in applicability by the sheer number and variety of smartphones on the market.

One popular smartphone feature is push-to-talk functionality. When using a push-to-talk mode, the smartphone user provides an input to the smartphone to place the smartphone in transmit or broadcast mode where the microphone is enabled. Transmit or broadcast mode is exited or ended when the smartphone user provides a second input to the smartphone indicating the termination of transmit or broadcast mode.

Push-to-talk functionality may be provided by adding conductors to the traditional tip-ring-ring-sleeve connector (e.g. a tip-ring-ring-ring-sleeve or TRRRS plug and jack). The added conductors provide one or more additional signal paths to the smartphone, which when coupled with appropriate changes to the smartphone operating system or software may be used to enter and exit a push-to-talk mode. Such added conductors require modification to smartphone components such as the jack which must be altered to accommodate the extra conductor on the TRRRS plug. Additionally, smartphone software or firmware may require modification or updating to support PTT functionality based on a modified TRRRS jack. Such modifications may be costly and inefficient, particularly when manufacturers resort to the use of customized or proprietary algorithms to facilitate PTT functionality.

Thus, hardware capable of providing push-to-talk functionality while reducing or eliminating the need to modify or customize smartphone hardware, software or firmware is desirable.

BRIEF SUMMARY

Current smartphone headsets use either a 2.5 mm or a 3.5 mm plug having three electrical contacts (e.g., a TIP-RING-SLEEVE jack) or four electrical contacts (e.g., a TIP-RING-RING-SLEEVE jack). Plugs having four electrical contacts can be used to enable an audible input device such as a microphone coupled to or integrated in the headset. The presence of the fourth electrical contact providing the audible input or microphone circuit makes it possible for the smartphone to recognize inputs such as button presses provided via the headset. For example, multiple buttons corresponding to PLAY/PAUSE, NEXT and PREVIOUS functionality may be provided on the headset to facilitate the use of the smartphone as a portable audio/visual player. In at least some instances, since headset microphone functionality is preserved when the NEXT and PREVIOUS buttons are actuated by a user, the NEXT and PREVIOUS buttons may be reconfigured within the smartphone operating system or via one or more applications executed under the smartphone operating system to provide additional functionality. Although activating the PLAY/PAUSE button may mute the headset microphone, the smartphone operating system may be altered or one or more applications may be executed under the smartphone operating system may be used to permit nearly any functionality (including use of the microphone) when the PLAY/PAUSE button is pressed.

A user-actuatable push-to-talk ("PTT") input device such as a mechanical, electrical, or electromechanical switch or button on the headset may be operably coupled to one or more circuits capable of generating a number of signals each having a similar or different pulse count, pulse number, pulse frequency or the like. Some or all of the number of pulses so generated may be provided as a inputs to an operating system executed by a portable electronic device such as a smartphone via a standard TRRS jack. Within the portable electronic device, such pulsed signals may be recognized as indicative of distinct PTT button press and PTT button release events. For example, when a user actuates (e.g., DEPRESSES) the PTT button on the push-to-talk headset at a first time, a low impedance circuit may generate a first signal containing a number of pulses (e.g., a single pulse of defined duration). The first signal is transmitted from the push-to-talk headset to the smartphone via a TRRS jack. Within the smartphone, receipt of the first signal may be interpreted by the smartphone operating system or application as indicating the user's desire to open or initiate a PTT session with one or more external electronic devices. Conversely, when a user actuates (e.g., RELEASES) the PTT button on the headset at a second time, a second signal containing a number of pulses (e.g., two pulses of defined pulse width and frequency) may be transmitted from the push-to-talk headset to the smartphone via a TRRS jack. Within the smartphone, receipt of the second signal may be interpreted by the smartphone operating system or application as indicating the user's desire to close or cease the PTT session with the one or more external electronic devices.

Within the push-to-talk headset, a pulse generator circuit can be used to generate one or more pulse patterns. Such pulses may be generated forming a momentary or temporally transitory low impedance circuit. The generation of any number of pulse patterns, each distinguishable from the others, can enable the transmission of clearly defined and easily identified, yet simple, signals to the smartphone via the TRRS jack. Such can provide a smartphone with robust PTT capabilities while requiring no modification to the smartphone hardware and minimal or no modifications to the smartphone operating system.

An audio device may be summarized as including a connector including a tip, a first ring, a second ring, and a sleeve, the tip, the first ring, the second ring, and the sleeve each electrically conductive and electrically isolated from one another; a microphone electrically coupled between the sleeve and the second ring; a user-actuatable push-to-talk device transitionable between at least a first state and a second state communicably coupled between the sleeve and the second ring; wherein, responsive to a transition from the first state to the second state, the push-to-talk device provides a first number of pulses, each pulse comprising a low impedance electrical connection across the microphone for at least a first duration and each pulse separated from another pulse by a high impedance electrical connection across the microphone for at least a second duration; and wherein, responsive to a transition from the second state to the first state, the push-to-talk device provides a second number of pulses.

The audio device may further include a first speaker electrically coupled between the tip and the second ring; and a second speaker electrically coupled between the first ring and the second ring.

The first and the second speakers may be part of a headset. The push-to-talk device may include at least one set of momentary, normally closed, contacts and at least one set of momentary, normally open, contacts. The push-to-talk switch may be biased to the first state.

The audio device may further include a mechanical lock selectively operable to retain the push-to-talk switch in the second state.

The first duration may about 200 milliseconds or more; and the second duration may be about 200 milliseconds or more. The first number of pulses may consist of one pulse; and the second number of pulses may consist of two pulses. The connector may include either a 3.5 mm diameter tip-ring-ring-sleeve connector or a 2.5 mm diameter tip-ring-ring-sleeve connector. The low impedance electrical connection may include an electrical short circuit.

The audio device may further include a first adjustment device transitionable between at least a first state and a second state communicably coupled between the sleeve and the second ring; wherein, responsive to a transition from the first state to the second state, the first adjustment device provides the first number of pulses, each pulse comprising an electrical connection having a first impedance across the microphone for at least the first duration and each pulse separated from another pulse by the high impedance electrical connection across the microphone for at least the second duration; and wherein, responsive to a transition from the second state to the first state, the first adjustment device provides the second number of pulses.

The audio device may further include a housing at least partially enclosing the microphone, the push-to-talk device, and the first adjustment device.

The first impedance may be no more than about 400 ohms.

The audio device may further include a second adjustment device transitionable between at least a first state and a second state and communicably coupled between the sleeve and the second ring; wherein, responsive to a transition from the first state to the second state, the second adjustment device provides the first number of pulses, each pulse comprising an electrical connection having a second impedance across the microphone for at least the first duration and each pulse separated from another pulse by the high impedance electrical connection across the microphone for at least the second duration; and wherein, responsive to a transition from the second state to the first state, the second adjustment device provides the second number of pulses.

The audio device may further include a housing at least partially enclosing the microphone, the push-to-talk device, the first adjustment device, and the second adjustment device.

The second impedance may be no less than about 400 ohms. The first and the second switches may be biased to the first state.

An audio method may be summarized as including coupling a microphone between a sleeve and a second ring of a tip-ring-ring-sleeve connector to provide an audio input circuit; and coupling push-to-talk device between the sleeve and the second ring, the push-to-talk device selectively operable to provide a first number of pulses responsive to a transition of the push-to-talk device from a first state to a second state and selectively operable to provide a second number of pulses responsive to a transition of the push-to-talk device from the second state to the first state.

Coupling push-to-talk device between the sleeve and the second ring, the push-to-talk device selectively operable to provide a first number of pulses responsive to a transition of the push-to-talk device from a first state to a second state and selectively operable to provide a second number of pulses responsive to a transition of the push-to-talk device from the second state to the first state may include providing for each of the first number of pulses a low impedance electrical connection across the microphone for at least a first duration; and providing between each of the first number of pulses a high impedance electrical connection across the microphone for at least a second duration. Providing for each of the first number of pulses a low impedance electrical connection across the microphone for at least a first duration may include providing for each of the first number of pulses an electrical short circuit across the microphone for at least about 200 milliseconds (mS). Providing between each of the first number of pulses a high impedance electrical connection across the microphone for at least a second duration may include providing between each of the first number of pulses a high impedance electrical connection across the microphone for at least about 200 milliseconds (mS). Coupling push-to-talk device between the sleeve and the second ring, the push-to-talk device selectively operable to provide the first number of pulses responsive to the transition of the push-to-talk device from a first state to a second state and selectively operable to provide a second number of pulses responsive to a transition of the push-to-talk device from the second state to the first state may include providing for the first number of pulses at least one pulse; and providing for the second number of pulses at least two pulses.

The audio method may further include coupling a first adjustment device transitionable between at least a first state and a second state between the sleeve and the second ring, the first adjustment device selectively operable to provide the first number of pulses responsive to a transition of the first adjustment device from a first state to a second state and selectively operable to provide the second number of pulses responsive to a transition of the first adjustment device from the second state to the first state.

Coupling a first adjustment device between the sleeve and the second ring, the first adjustment device selectively operable to provide a first number of pulses responsive to a transition of the first adjustment device from a first state to a second state and selectively operable to provide a second number of pulses responsive to a transition of the first adjustment device from the second state to the first state may include providing for each of the first number of pulses an electrical connection across the microphone having an impedance of no more than about 400 ohms for at least about 200 milliseconds (mS); and providing between each of the first number of pulses a high impedance electrical connection across the microphone for at least about 200 milliseconds (mS).

The audio method may further include coupling a second adjustment device transitionable between at least a first state and a second state between the sleeve and the second ring, the second adjustment device selectively operable to provide the first number of pulses responsive to a transition of the second adjustment device from a first state to a second state and selectively operable to provide the second number of pulses responsive to a transition of the second adjustment device from the second state to the first state.

Coupling a second adjustment device transitionable between at least a first state and a second state between the sleeve and the second ring, the second adjustment device selectively operable to provide the first number of pulses responsive to a transition of the second adjustment device from a first state to a second state and selectively operable to provide the second number of pulses responsive to a transition of the second adjustment device from the second state to the first state may include providing for each of the first number of pulses an electrical connection across the microphone having an impedance of no less than about 400 ohms for at least the about 200 milliseconds (mS); and providing between each of the first number of pulses a high impedance electrical connection across the microphone for at least about 200 milliseconds (mS).

BRIEF DESCRIPTION OF THE SEVERAL VIEWS OF THE DRAWINGS

In the drawings, identical reference numbers identify similar elements or acts. The sizes and relative states of elements in the drawings are not necessarily drawn to scale. For example, the positions of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wireless communication devices such as cellular phones, smartphones, and/or radios have not been shown or described in detail to avoid unnecessarily obscuring descriptions of the embodiments. Additionally, well-known circuits such a pulse output circuits have also not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Although the push-to-talk functionality is described herein with respect to a representative tip-ring-ring-sleeve configuration, it is readily appreciated by one of ordinary skill in the art that similar configurations of a tip-ring-ring-sleeve connector may be substituted to achieve a similar or a comparable result.

Figure 1:
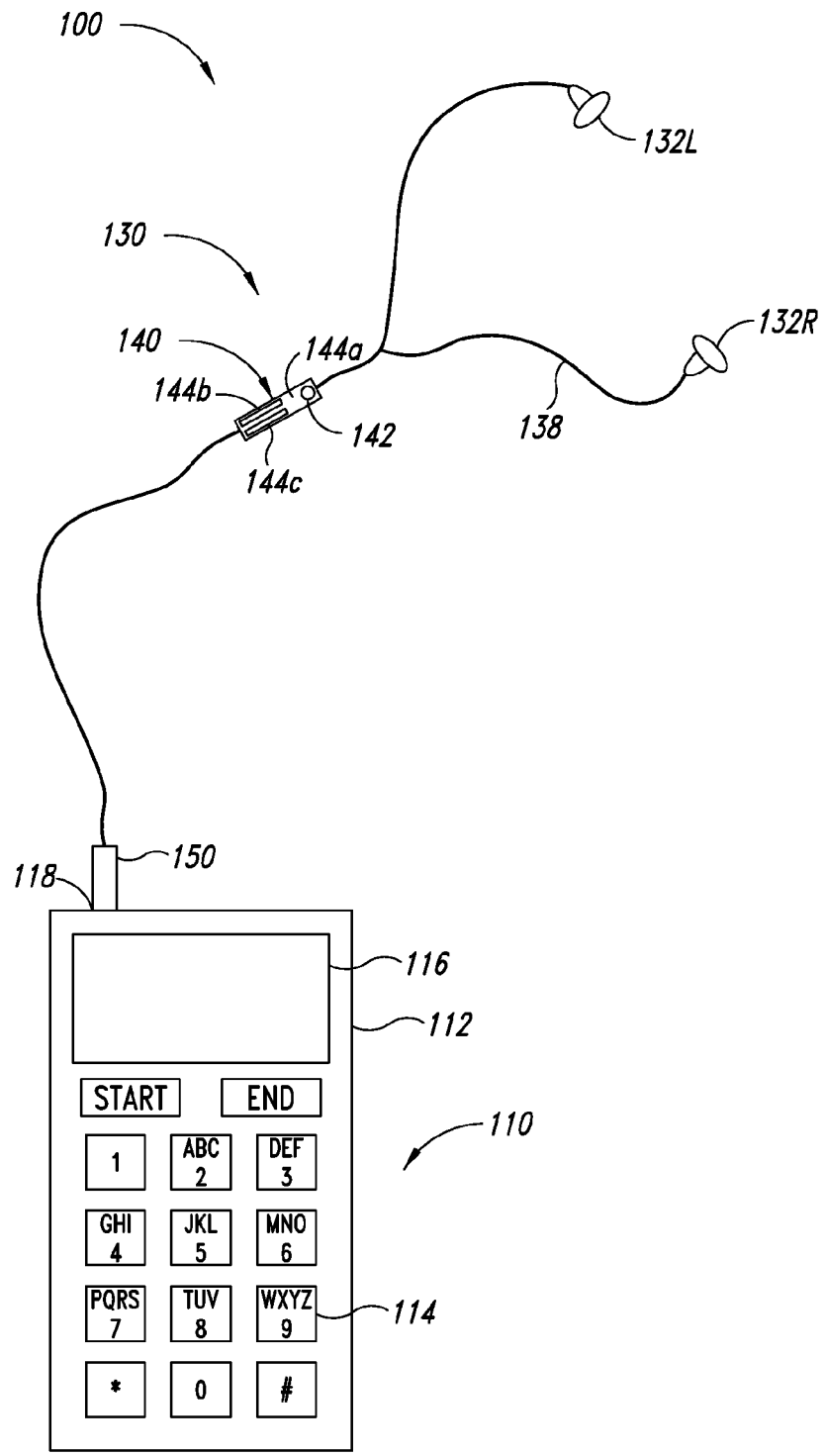
FIG. 1 is a perspective view of an illustrative portable electronic device such as a smartphone operably coupled to a push-to-talk headset including two audio output devices, an audio input device, and a number of user actuatable input devices, according to one non-limiting illustrated embodiment.

FIG. 1 shows an example portable electronic device 110 operably, communicably, and electrically coupled to a push-to-talk headset system 130 including a housing 140 at least partially containing an audio input device such as a microphone 142, any number of user-actuatable input devices 144A-144C (collectively "user-actuatable input devices 144") and a pulse generation circuit that is internal to the housing 140 and thus not directly visible in FIG. 1, according to at least one illustrative embodiment. The operable, communicable, and electrical coupling between the push-to-talk headset system 130 and the portable electronic device 110 is accomplished using a jack 118 communicably located on the portable electronic device 110 and a complimentary connector 150 that is communicably coupled to the headset system 130. In at least some instances, the jack 118 on the portable electronic device can include a TIP-RING-SLEEVE ("TRS") or a TIP-RING-RING-SLEEVE ("TRRS") female jack in which a complimentary male TRS or TRRS connector 150 can be inserted.

The portable electronic device 110 can include one or more user interfaces 114 and one or more output devices 116 disposed at least partially within a housing 112. In at least some instances, the one or more user interfaces 114 and the one or more output devices 116 may be disposed such that at least a portion of the one or more user interfaces 114 and the one or more output devices 116 remain at least partially exposed or user accessible, for example on an exterior surface of the portable electronic device 110. Example portable electronic devices 110 can include, but are not limited to portable telephones, smartphones, personal digital assistants, portable cellular communications devices, portable media players, portable computing devices, portable gaming systems, and similar.

The push-to-talk headset system 130 includes any number of audio output devices such as speakers 132R and 132L depicted in FIG. 1. The push-to-talk headset system 130 additionally includes an audio input device 142 such as a microphone. The audio input device 142 may be at least partially disposed in a housing 140 along with any number of user-actuatable input devices such as mechanical, electrical, or electromechanical switches, buttons, knobs, or the like. Three such user-actuatable input devices 144A-144C (collectively "user-actuatable input devices 144) are depicted in FIG. 1. The user-actuatable input devices 144 can include, but are not limited to any current or future developed, mechanical switches, electromechanical switches, capacitive switches, resistive switches, or any combination thereof. Although not directly visible in FIG. 1, at least one of the user-actuatable input devices 144 may be operably, communicably, or electrically coupled to the pulse generation circuit located in the housing 140. Pulses generated by the pulse generation circuit can be transmitted from the push-to-talk headset system 130 to the portable electronic device 110 via one or more conductors 148 electrically coupling the pulse generator circuit to the TRRS connector 150.

The portable electronic device 110 can include any device capable of transmitting and receiving electromagnetic (e.g., radio frequency or "RF") signals carrying or conveying data representative of audio communication, data representative of visual communication, or any combination thereof. One or more user interfaces 114 permitting interaction between a device user and one or more functional aspects of the portable electronic device 110 are provided on at least a portion of the portable electronic device 110. Such user interfaces 114 may include any number or combination of current or future developed user input devices including, but not limited to mechanical pushbuttons or keys, capacitive buttons or keys, resistive buttons or keys, real or virtual keypads, real or virtual keyboards, and the like. In at least some instances, the user interface may include any number or combination of current or future developed pointing devices including but not limited to touchscreens, touchpads, joysticks, and the like.

The portable electronic device 110 may also include one or more output devices 116. The one or more output devices 116 may include any number or combination of audio output devices, visual output devices, haptic output devices, or the like. In at least some instances, all or a portion of the user interface 114 and the output device 116 may be combined to provide input and output functionality, for example one or more touchscreens may be used to provide both input and output functionality. Example audio output devices may include, but are not limited to any current or future developed output technology capable of producing human audible output, such as an electromechanical diaphragm speaker. Example visual output devices may include, but are not necessarily limited to display technologies such as liquid crystal displays ("LCD"), light emitting diode ("LED") displays, organic light emitting diode ("OLED") displays, polymer light emitting diode ("PLED") displays, and the like. Visual output devices may also include indicators, gauges, dials, and the like.

Although the push-to-talk headset system 130 can include any number of audio output devices 132, for clarity and ease of discussion a headset system having a left speaker 132L and a right speaker 132R (e.g., a headset capable of stereophonic output) will be considered for illustrative purposes. Those of ordinary skill in the art will readily appreciate that any number of audio output devices 132, including a monaural single audio output device 132, may be similarly employed. The audio output devices 132 include any system, device, or combination of devices capable of converting one or more analog or digital signals into a human perceptible audio presentation. In at least some instances, the audio output devices 132 may include one or more in-ear loudspeakers (e.g., "earbuds") or one or more over-the-ear loudspeakers (e.g., "cans"). The audio output devices 132 are electrically, communicably coupled to the portable electronic device 110 by coupling the TRRS connector 150 on the headset system 130 to the corresponding TRRS jack 118 on the portable electronic device 110.

The push-to-talk headset system 130 further includes an audio input device 142 such as a microphone or similar transducer capable of directly or indirectly converting an audio input such as sound into an analog or digital electrical signal representative of the audio input. In at least some instances the audio input device 142 can be at least partially disposed in a housing 140 used to accommodate the pulse generation circuit. In at least some instances, the audio input device 142 may be positioned proximate a user's mouth when the audio output devices 132 are disposed proximate the user's ears. In at least some instances a second audio input device may be included to provide an audio input to the portable electronic device 110 useful for noise cancellation when the portable electronic device is placed in a push-to-talk mode.

Figure 2:
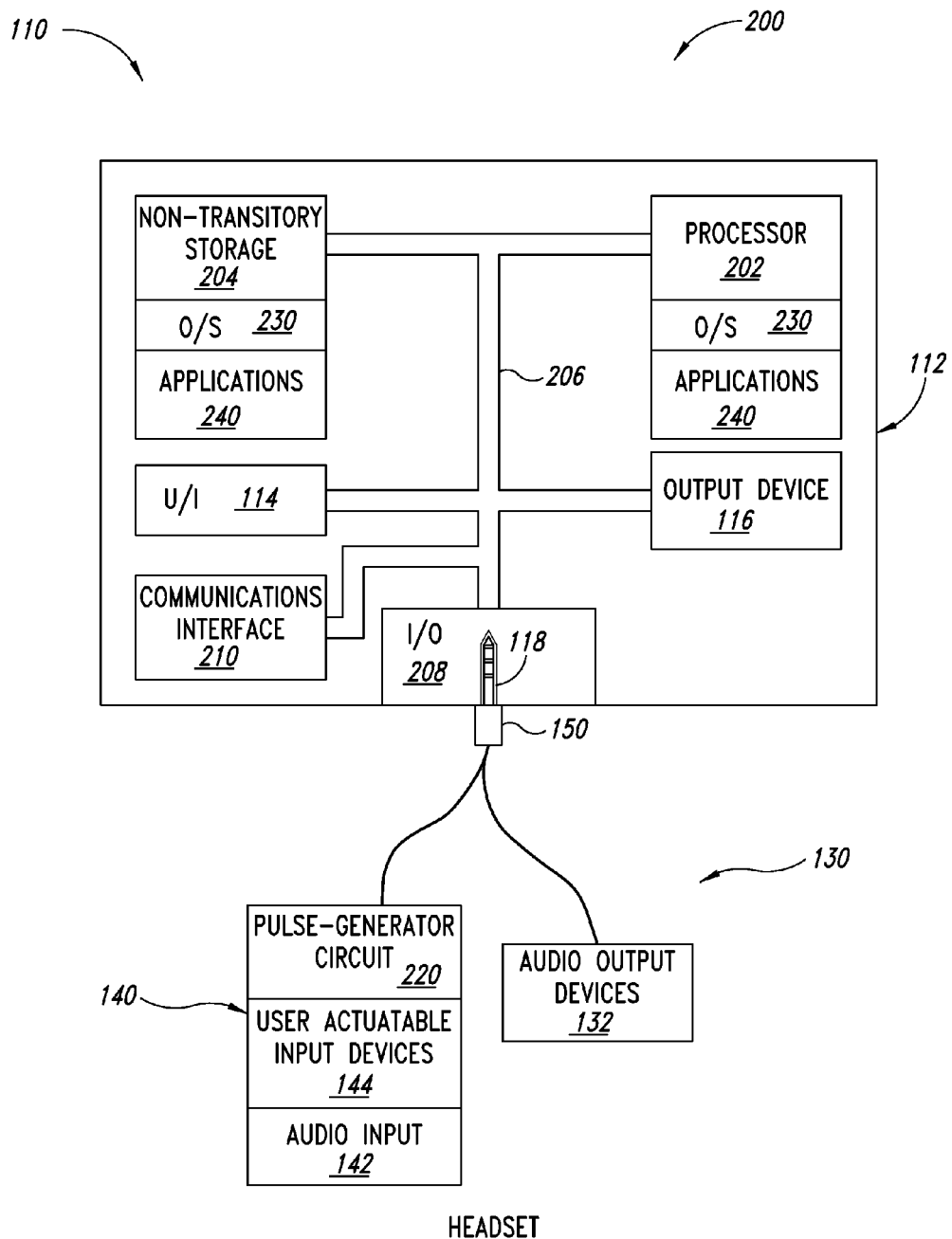
FIG. 2 is a block diagram of the illustrative portable electronic device such as a smartphone operably coupled to the push-to-talk headset depicted in FIG. 1, according to one illustrated embodiment.

FIG. 2 shows an illustrative system 200 including a portable electronic device 110 operably coupled to a push-to-talk headset 130 incorporating two audio output devices 132, an audio input device 142, a number of user-actuatable input devices 144, and a pulse generator circuit 220, according to one illustrated embodiment. In addition to the user interface 114, the output device 116, and the TRRS jack 118, the portable electronic device 110 also includes a processor 202, a nontransitory storage media 204, an input/output ("I/O") interface 208, and a communications interface 210. In at least some implementations, all or a portion of a processor executable operating system 230 or similar may be stored at least in part within a nontransitory portion of the processor 202. Similarly, in at least some implementations, all or a portion of any number of processor executable applications or "apps" 240 may be stored at least in part within a nontransitory portion of the processor 202. In at least some implementations, all or a portion of a processor executable operating system 230 or similar may be stored at least in part within the nontransitory storage media 204. Similarly, in at least some implementations, all or a portion of any number of processor executable applications or "apps" 240 may be stored at least in part within a nontransitory storage media 204.

The processor 202 can include any number or combination of systems or devices capable of executing one or more sets of machine or processor executable instructions. The processor 202 can include any number of cores or computing devices or machines (e.g., single, dual, or quad core). In at least some instances, the processor 202, nontransitory storage media 204, the user interface 114, the output device 116, and at least one input/output ("I/O") interface 208 may be bidirectionally communicably coupled via any number of serial or parallel buses 206. Example processors 202 can include, but are not limited to, one or more digital signal processors ("DSP"), one or more application specific integrated circuits ("ASIC"), one or more programmable gate arrays ("PGA"), or combinations thereof. Some or all of the nontransitory storage 204, I/O interface 208, and communications interface 210 may be disposed on one or more common components, for example a System on a Chip ("SoC") package.

The nontransitory storage media 204 can include any number or combination of current or future nontransitory data storage devices. In at least some instances, at least a portion of the nontransitory storage media 204 may be removable from the portable electronic device 110. The nontransitory storage media 204 may include any number or types of systems, devices or combinations of systems and devices capable of retaining or otherwise storing digital data. Example nontransitory storage media 204 can include, but are not limited to, read only memory ("ROM"), FLASH memory, or electrically erasable programmable read only memory ("EEPROM"), or combinations thereof.

The I/O interface 208 can include any number or combination of current or future wired or wireless I/O interfaces that facilitate the exchange of digital or analog data between the portable electronic device 110 and an external network or device. Example wired I/O interfaces can include, but are not limited to, the TRRS jack 118, an Ethernet port, a universal serial bus ("USB") interface, an IEEE 1394 (Firewire®) interface, a proprietary interface (e.g., an Apple dock), or the like. Example wireless I/O interfaces can include, but are not limited to a Bluetooth® interface, a near field communication ("NFC") interface, and the like.

The communications interface 210 can include any number or combination of current or future wireless RF interfaces that facilitate the exchange of digital or analog data between the portable electronic device 110 and one or more external electronic or network devices. In at least some implementations, the digital or analog data may include at least in part, voice communication, video communication, or combinations thereof. Example communications interfaces may include, but are not limited to, any current or future developed cellular data transfer technologies such as code division multiple access ("CDMA"), global system for mobile communications ("GSM"), and integrated digital enhanced network ("iDEN"), and the like.

Any current or future mobile or desktop operating system such as Windows 8® by Microsoft®, iOS® 6 by Apple®, Android® by Google®, Blackberry OS® by BlackBerry® Ltd., or similar may be executed by the at least one processor 202. In at least some instances, the operating system 230 can monitor and control some or all of the communication and exchange of data between the portable electronic device 110 and the push-to-talk headset system 130. In at least some instances, the operating system 230 executed by the processor 202 can alter, adjust or control one or more operational aspects of the portable electronic device 110 based at least in part on the presence or absence of the push-to-talk headset system 130. For example, the operating system 230 may detect the communicable coupling of the headset system 110 to the TRRS jack 118 and adjust one or more portable electronic device parameters (e.g., disrupt an audio signal to an on-board audio output device in the portable electronic device) responsive to detecting the communicable coupling of the headset system 130. In some instances, the operating system 230 may call the processor 202 to execute one or more applications 240 or "apps" stored in the nontransitory storage media 204 responsive to detecting the communicable coupling of the push-to-talk headset system 130 to the TRRS jack 118.

In other instances, at least a portion of one or more applications 240 may be intermittently or continuously executed by the processor 202 at or under the direction of the operating system 230. In at least some instances, such applications 240 may interface with the operating system 230 (i.e., unidirectionally or bidirectionally transfer data to/from) via one or more application program interfaces ("APIs") or any similar electronic data transfer interface. In such instances, the operating system 230 may pass data indicative of the communicable coupling of the push-to-talk headset system 130 to the TRRS jack 118 to the application 240 via the API. Responsive to the receipt of the indication of a communicably coupled push-to-talk headset system 130, the operating system 230, the application 240, or some combination thereof may functionally and operationally provide push-to-talk functionality with one or more external electronic devices via the communications interface 210. Such push-to-talk functionality may be provided for example by opening a half- or full-duplex radio frequency voice communication channel via the communications interface 210 when one or more defined events occur using the push-to-talk headset 130 (e.g., a user-actuatable push-to-talk switch 144A is transitioned from a first state to a second state by the device user).

The push-to-talk headset system 130 can include at least one pulse generator circuit 220 capable of generating a signal perceptible to at least one of the device operating system 230 or an application 240 executed by a portable electronic device 110. The output signal provided by the pulse generator circuit 220 can include any defined number of pulses having any defined duration occurring any defined frequency or interval. The output signal generated by the pulse generator circuit 220 can include any pulsed signal detectible by the operating system 230 of the portable electronic device 110. In at least some instances, each of the pulses in the pulsed output signal provided by the pulse generator circuit 220 may be interpreted by the operating system 230 as representative of a "button click" event on the push-to-talk headset 130.

One or more user-actuatable input devices 144 may be operably coupled to the pulse generator circuit 220 such that a full or partial displacement or transition of one or more user-actuatable input devices from a first state (e.g., RAISED) to a second state (e.g., DEPRESSED) causes the output of a number of pulses from the pulse generation circuit 220. For example, a user displacing or transitioning the user-actuatable input device 144 from a RAISED position (i.e., first state) to a DEPRESSED position (i.e., second state) may cause the pulse generation circuit 220 to generate and send a first signal containing one pulse detectible as a single button click event by the operating system 230 of the portable electronic device 110. A user releasing the user-actuatable input device from the DEPRESSED position (i.e., second state) to the RAISED position (i.e., first state) may cause the pulse generation circuit 220 to generate and send a second signal that is distinguishable from the first signal (e.g., a second signal containing two pulses) detectible as a double button click by the operating system 230 of the portable electronic device 110. In at least some implementations, receipt of the first signal by the operating system 230 may cause the operating system 230 or an application 240 to perform a first action such as placing the portable electronic device in a push-to-talk mode. In at least some implementations, receipt of the second signal by the operating system 230 may cause the operating system 230 or an application 240 to perform a second action such as removing the portable electronic device from a push-to-talk mode.

Figure 3A:
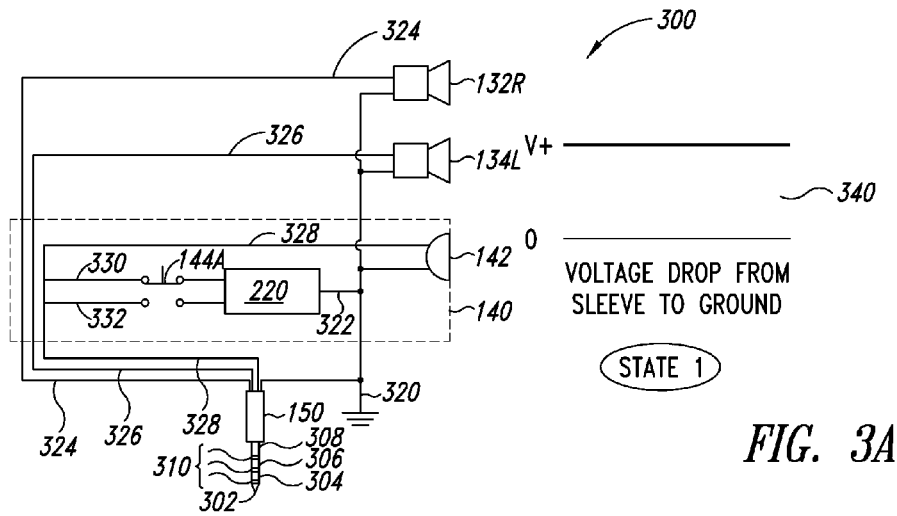
FIG. 3A is a schematic diagram of a push-to-talk headset system including a pulse generation circuit and at least one user actuatable input device (a push-to-talk switch) communicably coupled to the pulse generation circuit, according to one illustrated embodiment.
Figure 3B:
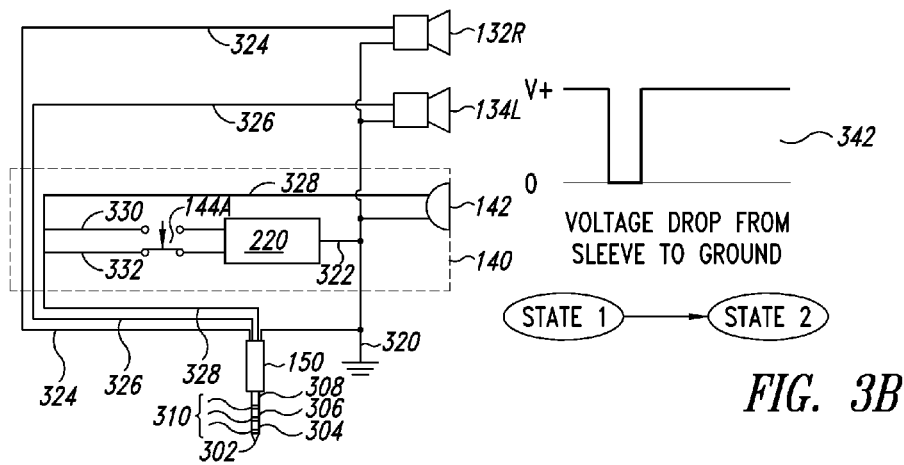
FIG. 3B is a schematic diagram of the push-to-talk headset system including the pulse generation circuit with the at least one user actuatable input device (a push-to-talk switch) transitioning to a first state along with an accompanying plot of voltage against time showing a pulsed first signal generated by the pulse generator circuit, according to one illustrated embodiment.
Figure 3C:
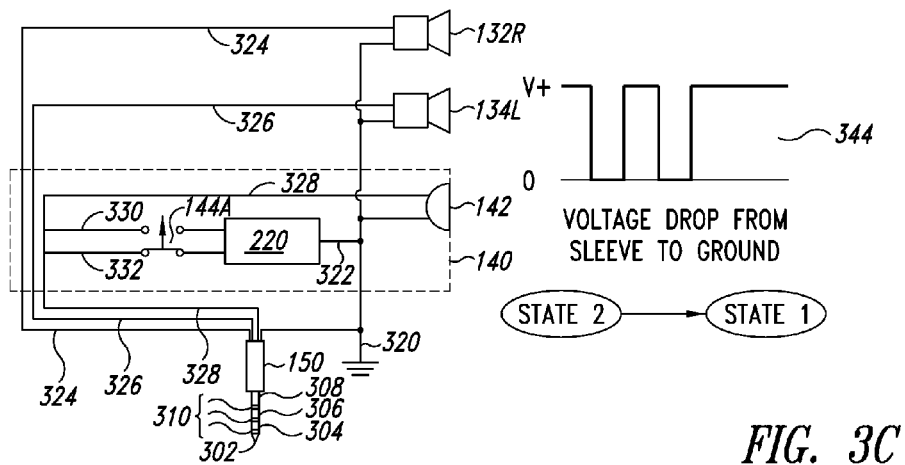
FIG. 3C is a schematic diagram of the push-to-talk headset system including the pulse generation circuit with the at least one user actuatable input device (a push-to-talk switch) transitioning to a second state along with an accompanying plot of voltage against time showing a pulsed second signal generated by the pulse generator circuit, according to one illustrated embodiment.

FIG. 3A shows a push-to-talk headset system 130 prior to user actuation of a user-actuatable push-to-talk switch 144A, according to one illustrated embodiment. Also depicted in FIG. 3A is an illustrative plot 340 of voltage over time for an example pulse generator circuit 220 output showing the voltage drop between an audio input device circuit 328 and ground 320. FIG. 3B shows a push-to-talk headset system 130 upon user actuation (e.g., PRESS) and transition of the user-actuatable push-to-talk switch 144A from a first state to a second state, according to one illustrated embodiment. Also depicted in FIG. 3B is an illustrative plot 342 of voltage over time for an example pulse generator circuit 220 output showing an example first signal including a momentary or temporally transitory single pulse comprising a low impedance circuit or electrical short (i.e., zero (0) voltage drop) established between the audio input device circuit 328 and ground 320. FIG. 3C shows a push-to-talk headset system 130 upon user actuation (e.g., RELEASE) of the user-actuatable push-to-talk switch 144A from the second state to the first state, according to one illustrated embodiment. Also depicted in FIG. 3C is an illustrative plot 344 of voltage over time for an example pulse generator circuit 220 output showing an example second signal including two momentary or temporally transitory pulses, each pulse comprising a low impedance circuit or electrical short (i.e., zero (0) voltage drop) between the audio input device circuit 328 and ground 320.

As shown in FIGS. 3A-3C, the TRRS plug 150 can include a number of conductive surfaces including a tip 302, a first ring 304, a second ring 306, and a sleeve 308 each physically separated and electrically isolated from the other by one or more insulators 310.

FIG. 3A depicts a TRRS connector 150 coupled to the audio input device or microphone 142, a user-actuatable input device or push-to-talk switch 144A, a first audio output device or speaker 132R and a second audio output device or speaker 132L. The tip-ring-ring-sleeve connector 150 includes a conductive, cylindrical shaped, segmented, shaft extending from a larger, non-conductive, body facilitating manipulation of the connector 150 by a user. The tip-ring-ring-sleeve connector 150 obtains its name from the structure of the conductive shaft which contains a tip 302, a first ring 304, a second ring 306, and a sleeve 308. The tip 302, the first ring 304, the second ring 306, and the sleeve 308 are electrically conductive and are electrically coupled to the respectively numbered and named tip conductor 322, first ring conductor 324, second ring 326 conductor, and sleeve 328 conductor. To electrically isolate the tip 302, first ring 304, second ring 306, and sleeve 308 from each other, isolators 310 are disposed between the tip 302, the first ring 304, the second ring 306, and the sleeve 308 on the tip-ring-ring-sleeve plug 150.

The shaft of the tip-ring-ring-sleeve plug 150 can be of any available dimension, with diameters of 3.5 mm (approx. ⅛") and 2.5 mm (approx. 3/32") being used for many compact electrical devices such as smartphones. In some instances, larger shafts, for example a ¼" diameter shaft, may also be used. Each of the tip 302, first ring 304, second ring 306 and sleeve 308 is formed of an electrically conductive material, brass and aluminum being but two of many example conductive materials amenable for use as a tip-ring-ring-sleeve plug 150. Electrically non-conductive materials (i.e., insulators) 310 are disposed to electrically isolate the tip 302, the first ring 304, the second ring 306 and the sleeve 308 from each other.

The user-actuatable push-to-talk switch 144A may include a double pole, single throw, switch momentary, normally-closed, switch capable of a user-actuatable, selective, displacement between a first state (depicted in FIGS. 3A and 3C) in which a first push-to-talk circuit 330 is coupled in electrical parallel with the audio input circuit 328, and a second state (depicted in FIG. 3B) in which a second push-to-talk circuit 332 is coupled in electrical parallel with the audio input circuit 328. In at least some implementations, one or more mechanical, electrical, or electromechanical latches or locks may be operably coupled to the user-actuatable push-to-talk switch 144A to maintain the switch in the first state or in the second state without requiring the user to hold the push-to-talk switch 144A in the desired state. The audio input circuit 328, the first push-to-talk circuit 330, and the second push-to-talk circuit 332 electrically couple the second ring 306 to the sleeve 308 of the tip-ring-ring-sleeve plug 150. In at least some instances, when transitioned from a first state to a second state, the user-actuatable push-to-talk switch 144A provides a first input via 330 to the pulse generator circuit 220 causing the pulse generator circuit 220 to generate the first signal as an output at 322. In at least some instances, when transitioned from the second state to the first state, the user-actuatable push-to-talk switch 144A provides a second input via 332 to the pulse generator circuit 220 causing the pulse generator circuit 220 to generate the second signal as an output at 322.

In at least some instances, as shown in FIG. 3B, the pulse generator circuit 220 can generate a first signal including a number of pulses in response to detecting a transition in input from the first push-to-talk circuit 330 to the second push-to-talk circuit 332 corresponding to a user actuating the user-actuatable push-to-talk switch 144A from the first state to the second state (e.g., a first "button-click" event corresponding to a user DEPRESSING the user actuatable push-to-talk switch 144A). The number of pulses generated responsive to detecting a transition from the first state to the second state can include any number of pulses such as: one or more pulses; 5 or more pulses; or 10 or more pulses. Where the first signal includes multiple pulses, each pulse in the first signal may be temporally separated from the other pulses in the second signal by a duration of about 100 milliseconds (mS) or less; about 150 mS or less; about 200 mS or less; about 300 mS or less; or about 400 mS or less.

In at least some instances, the first signal can include a single pulse created by completing a momentary or similar transitory low impedance circuit of a defined first duration between the audio-input circuit 328 and ground 320. The first duration can be about 100 milliseconds (mS) or less; about 150 mS or less; about 200 mS or less; about 300 mS or less; or about 400 mS or less. The first signal is detectible by the operating system 230 or application 240 executed by the portable electronic device 110. In at least some instances, responsive to receipt of the first signal from the pulse generator circuit 220 in the push-to-talk headset 130, the operating system 230 can send a notification (e.g., an interrupt or similar) indicative of the received first signal to a push-to-talk application 240 executing on the portable electronic device 110. Responsive to the arrival of the first signal notification from the operating system 230, the application 240 can place the portable electronic device 110 in a push-to-talk mode in which a half- or full-duplex communication channel is established between the portable electronic device and one or more external electronic devices.

In at least some instances, as shown in FIG. 3C, the pulse generator circuit 220 can generate a second signal including a number of pulses in response to detecting a transition in input from the second push-to-talk circuit 332 to the first push-to-talk circuit 330 corresponding to a user actuating the user-actuatable push-to-talk switch 144A from the second state to the first state (e.g., a "button-click" event corresponding to a user RELEASING the user actuatable push-to-talk switch 144A). The number of pulses generated responsive to detecting a transition from the second state to the first state may be the same or different than the number of pulses generated responsive to detecting a transition from the first state to the second state and may include any number of pulses such as: 2 or more pulses; 5 or more pulses; or 10 or more pulses. Where the second signal includes multiple pulses, each pulse in the second signal may be temporally separated from the other pulses in the second signal by a duration of about 100 milliseconds (mS) or less; about 150 mS or less; about 200 mS or less; about 300 mS or less; or about 400 mS or less.

In at least some instances, the second signal can include two pulses created by completing two momentary or similar transitory low impedance electrical circuits of a defined second duration between the audio-input circuit 328 and ground 320. The second duration can be about 100 milliseconds (mS) or less; about 150 mS or less; about 200 mS or less; about 300 mS or less; or about 400 mS or less. The second signal is detectible by the operating system 230 or application 240 executed by the portable electronic device 110. In at least some instances, responsive to receipt of the second signal from the pulse generator circuit 220 in the push-to-talk headset 130, the operating system 230 can send a notification (e.g., an interrupt or similar) indicative of the received second signal to a push-to-talk application 240 executing on the portable electronic device 110. Responsive to the arrival of the second signal notification from the operating system 230, the application 240 can remove the portable electronic device 110 from the push-to-talk mode.

Figure 4:
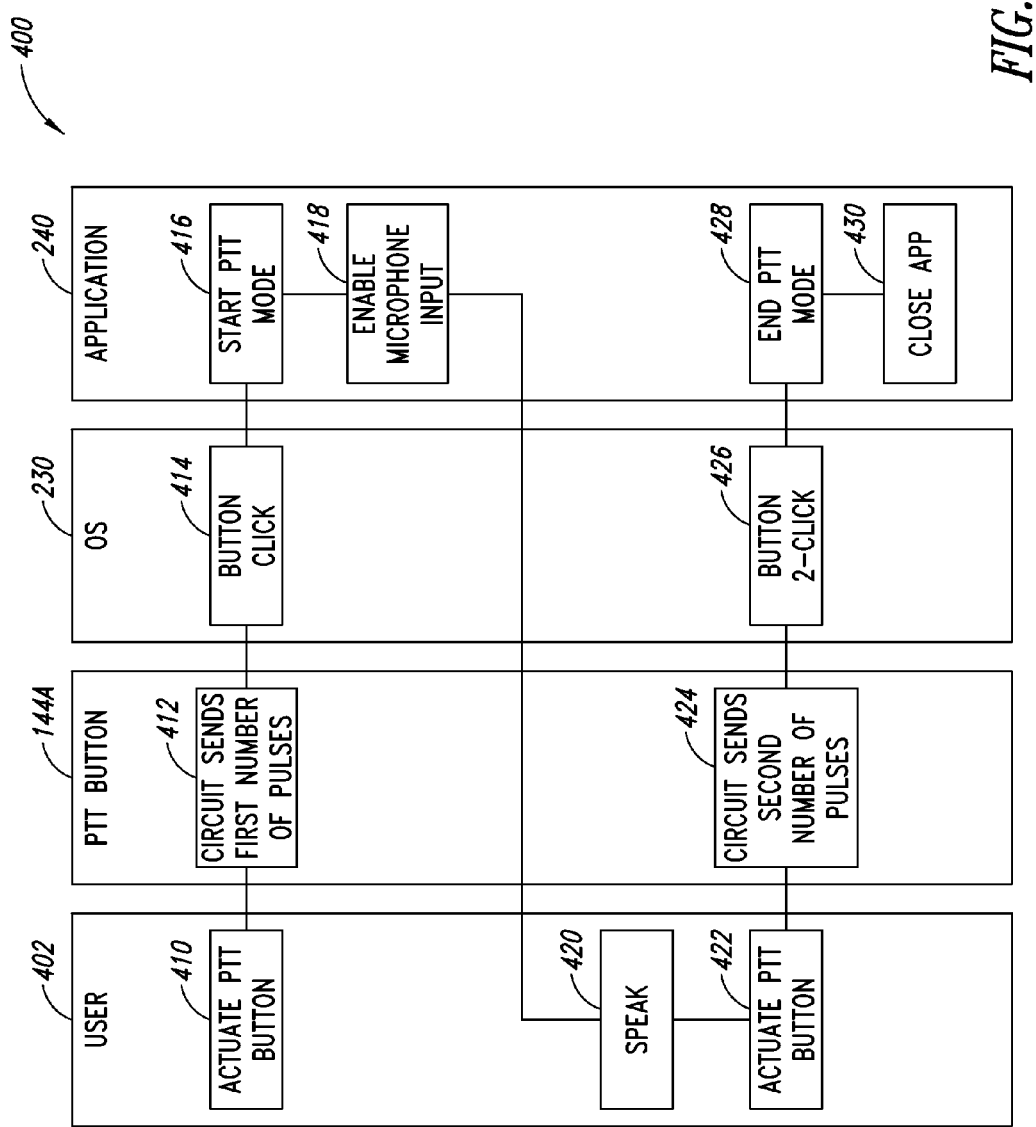
FIG. 4 is a high level flow diagram of an example push-to-talk session using a portable electronic device operably and communicably coupled to a push-to-talk headset as depicted in FIG. 1, according to one illustrated embodiment.

FIG. 4 shows a logic flow 400 of an illustrative push-to-talk session using a portable electronic device 110 communicably coupled to a push-to-talk headset 130 such as that described in detail above, according to one or more embodiments. The push-to-talk session is created as the result of interaction between a user 402, the user-actuatable push-to-talk switch 144A, the portable electronic device operating system 230, and an application 240 executed on the portable electronic device 110. Such interaction can advantageously provide push-to-talk capability on portable electronic devices 110 that are not equipped with native push-to-talk capabilities.

At 410, to indicate a desire for the portable electronic device to ENTER push-to-talk mode, a user actuates the user-actuatable push-to-talk switch 144A on the push-to-talk headset 130. Such actuation may include transitioning or physically displacing (e.g., DEPRESSING) a mechanical push-to-talk switch 144A from a first state to a second state or may include changing the electrically conductive state of a capacitive or resistive switch from a first electrically conductive state to a second electrically conductive state. The use of sealed or otherwise water and/or dust tight switches may advantageously enable the use of the push-to-talk headset 130 in environments traditionally considered hostile to electronic devices, for example environments where water, dirt, heat, etc. may be present.

At 412, responsive to the user actuating the push-to-talk switch 144A from the first state to the second state, the pulse generation circuit 220 generates the first signal including a first number of pulses. Each pulse is created by completing a momentary or temporally transitory low impedance circuit between the audio input device circuit 328 and ground 320 (e.g., one 200 mS duration pulse). The first signal is communicated from the pulse generator circuit 220 in the push-to-talk headset 130 to the TRRS jack 118 on the portable electronic device.

At 414, the operating system 230 of the portable electronic device 110 receives the first signal via the TRRS jack 118 and I/O interface 208. In at least some instances, the operating system 230 can interpret each of the pulses contained in the first signal as a respective "button-click event." For example, the operating system 230 can interpret the single 200 mS duration pulse generated at 412 as a single "button-click" event. Responsive to detecting the "button-click" event, the operating system can communicate a notification indicative of the received single "button-click" event to a push-to-talk application 240 executing on the portable electronic device 110.

At 416, responsive to receipt of the single "button-click" event notification from the operating system 230, the push-to-talk application 240 can place the portable electronic device in push-to-talk mode. In placing the portable electronic device in push-to-talk mode, the push-to-talk application 240 can enable one or more audio input devices 124 to receive audio input from the push-to-talk headset 130 at 418.

At 420, audio input received by the headset is transmitted via the communications interface 210 in the portable electronic device 110 to one or more external electronic devices. The external electronic devices can include, but are not limited to, one or more stationary or semi-stationary electronic devices such as a base station or a vehicle mounted electronic device, one or more portable electronic devices, or combinations thereof. The communication between the push-to-talk headset and the external electronic devices may include half- or full-duplex communications. In at least some instances, the portable electronic device 110 remains in push-to-talk mode as long as the user 402 maintains the push-to-talk switch 144A in the second position.

At 422, to indicate a desire for the portable electronic device to EXIT push-to-talk mode, the user 402 actuates the user-actuatable push-to-talk switch 144A on the push-to-talk headset 130. Such actuation may include transitioning or physically displacing (e.g., RELEASING) a mechanical push-to-talk switch 144A from a second state to a first state or may include changing the electrically conductive state of a capacitive or resistive switch from the second electrically conductive state to the first electrically conductive state.

At 424, responsive to the user actuating the push-to-talk switch 144A from the second state to the first state, the pulse generation circuit 220 generates the second signal including a second number of pulses. Each of the second number of pulses is created by completing a momentary or temporally transitory low impedance circuit between the audio input device circuit 328 and ground 320 (e.g., two 200 mS duration pulses separated by a 200 mS gap). The second signal is communicated from the pulse generator circuit 220 in the push-to-talk headset 130 to the TRRS jack 118 on the portable electronic device.

At 426, the operating system 230 of the portable electronic device 110 receives the second signal via the TRRS jack 118 and I/O interface 208. In at least some instances, the operating system 230 can interpret each of the pulses contained in the second signal as a respective "button-click event." For example, the operating system 230 can interpret each of the two 200 mS duration pulses in the second signal generated at 424 as a single "button-click" event (i.e., two "button-click" events or a "double-click" event). Responsive to detecting the "double-click" event, the operating system can communicate a notification indicative of the received "double-click" event to the push-to-talk application 240 executing on the portable electronic device 110.

At 428, responsive to receipt of the "double-click" event notification from the operating system 230, the push-to-talk application 240 can remove the portable electronic device from push-to-talk mode. In at least some instances, responsive to receipt of the "double-click" notification, the application 240 may partially or completely cease execution at 430.

Although illustratively described above in the context of a battery powered portable electronic device, embodiments incorporating one or more electro-mechanical relays or solid state control circuits may also be implemented. Such implementations may be powered using the smartphone internal battery, the smartphone external power supply, power supplied via an external source, or any combination thereof.

Figure 5:
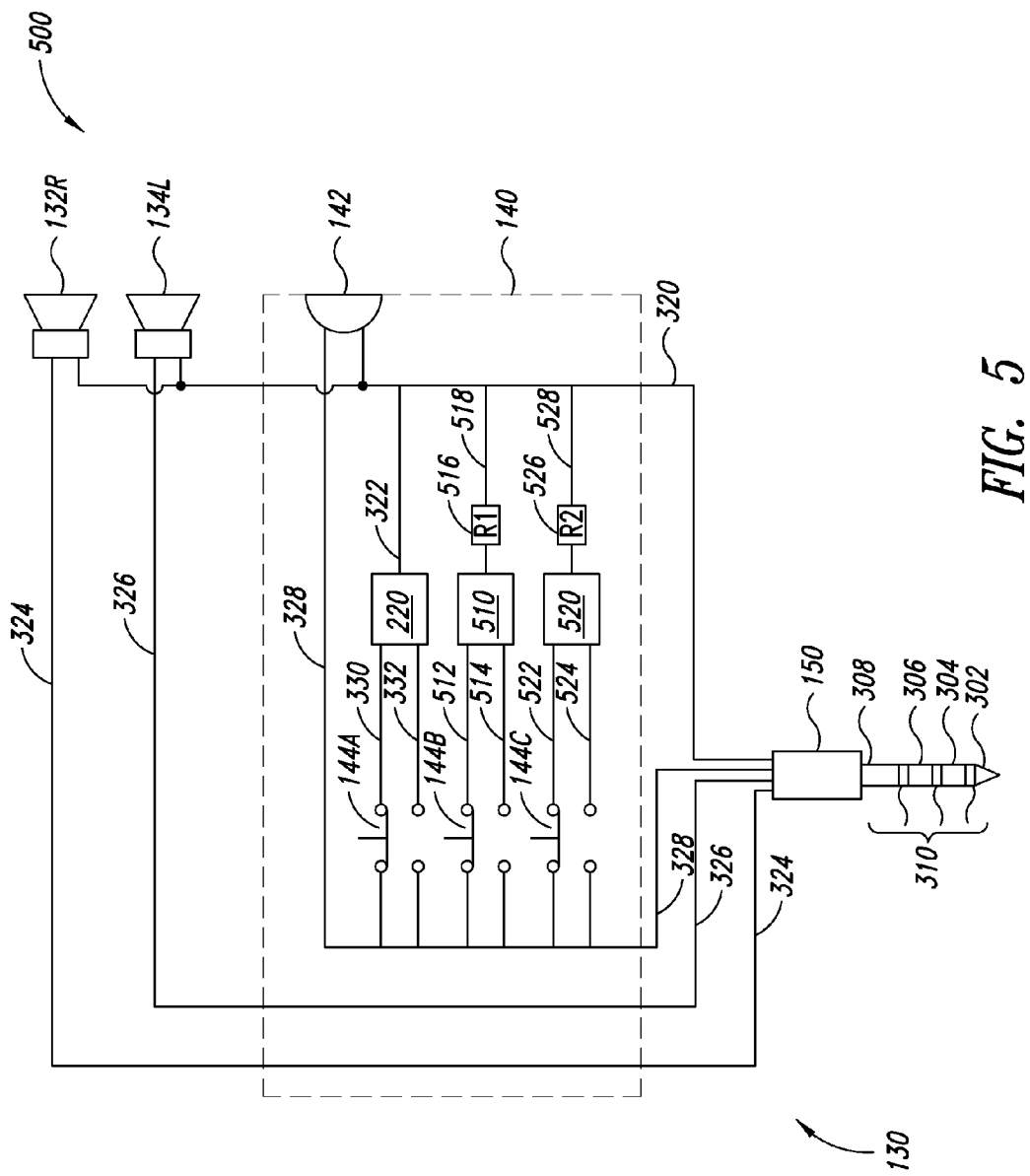
FIG. 5 is a schematic diagram of a push-to-talk headset system including three pulse generation circuits each coupled to a respective user actuatable input device, switch or button and a respective output circuit, according to one illustrated embodiment.

FIG. 5 shows a push-to-talk headset 130 that includes a push-to-talk pulse generation circuit 220 electrically coupled to the user actuatable push-to-talk switch 144A, a first pulse generation circuit 510 electrically coupled to a first user-actuatable adjustment device 144B and a first impedance 516, and a second pulse generation circuit 520 electrically coupled to a second user-actuatable adjustment device 144C and a second impedance 526, according to one embodiment. The first user-actuatable adjustment device 144B and the second user-actuatable adjustment device 144C may be included in the housing 140 shown in FIG. 5.

The first user-actuatable adjustment device 144B may include a double pole, single throw, switch momentary, normally-closed, switch capable of a user-actuatable, selective, displacement between a first state in which a first circuit 512 couples the first user-actuatable adjustment device 144B to the first pulse generator circuit 510 and a second state in which a second circuit 514 couples the first user-actuatable adjustment device 144B to the first pulse generator circuit 510. The first pulse generator circuit 510 can be coupled to the ground 320 through a first impedance 516 ("R1"). The first impedance 516 can have any defined impedance value. In at least some instances, the first impedance 516 can have an impedance value of about 220 ohms.

The second user-actuatable adjustment device 144C may include a double pole, single throw, switch momentary, normally-closed, switch capable of a user-actuatable, selective, displacement between a first state in which a first circuit 522 couples the second user-actuatable adjustment device 144C to the second pulse generator circuit 520 and a second state in which a second circuit 524 couples the second user-actuatable adjustment device 144C to the second pulse generator circuit 520. The second pulse generator circuit 520 can be coupled to the ground 320 through a second impedance 526 ("R2"). The second impedance 526 can have an impedance value different from the first impedance 516. The second impedance 526 can have any defined impedance value. In at least some instances, the second impedance 526 can have an impedance value of about 600 ohms.

The first user-actuatable adjustment device 144B and a second user-actuatable adjustment device 144C may be used to provide additional functions or features to the push-to-talk headset 130. Such buttons may similar to those used for PREVIOUS and NEXT functions on a non-push-to-talk headset. The presence of the first impedance 516 between the first pulse generator circuit 510 and ground 320 and the second impedance 526 between the second pulse generator circuit 520 and ground 320 permits the operating system 230 to uniquely distinguish user actuation of each of the push-to-talk switch 144A, the first user-actuatable adjustment device 144B, and the second user-actuatable adjustment device 144C.

The first pulse generator circuit 510 can generate a first signal including a number of pulses in response to detecting a transition in input from the first user-actuatable adjustment device circuit 512 to the second user-actuatable adjustment device circuit 514 corresponding to a user actuating the first user-actuatable adjustment device 144B from the first state to the second state (e.g., a first "button-click" event corresponding to a user DEPRESSING the first user-actuatable adjustment device 144B). The number of pulses generated by the first pulse generator circuit 510 responsive to detecting a transition or physical displacement of the first user-actuatable adjustment device 144B from the first state to the second state can include any number of pulses such as: one or more pulses; 5 or more pulses; or 10 or more pulses. Where the first signal generated by the first pulse generator circuit 510 includes multiple pulses, each pulse in the first signal may be temporally separated from the other pulses in the second signal by a duration of about 100 milliseconds (mS) or less; about 150 mS or less; about 200 mS or less; about 300 mS or less; or about 400 mS or less.

In at least some instances, the first signal can include a single pulse consisting of a momentary or similar transitory electrical circuit including resistive device 516 of a defined first duration between the audio-input circuit 328 and ground 320. The first duration can be about 100 milliseconds (mS) or less; about 150 mS or less; about 200 mS or less; about 300 mS or less; or about 400 mS or less. The first signal is detectible by the operating system 230 or application 240 executed by the portable electronic device 110. In at least some instances, responsive to receipt of the first signal from the first pulse generator circuit 510 in the push-to-talk headset 130, the operating system 230 can send a notification (e.g., an interrupt or similar) indicative of the received first signal to a push-to-talk application 240 executing on the portable electronic device 110. Responsive to the arrival of the first pulse generator circuit 510 first signal notification from the operating system 230, the application 240 can transition a first feature of the push-to-talk application 240 from a first state (e.g., STANDBY state) to a second (e.g., ACTIVE) state. Such first features may include performing a CHANNEL UP function, performing a CHANNEL DOWN function, performing a VOLUME UP function, performing a VOLUME DOWN function, engaging an alert mode, or any other function, service, activity or adjustment useful in a push-to-talk device.

The first pulse generator circuit 510 can generate a second signal including a number of pulses in response to detecting a transition in input from the second user-actuatable adjustment device circuit 514 to the first user-actuatable adjustment device circuit 512 corresponding to a user actuating the first user-actuatable adjustment device 144B from the second state to the first state (e.g., a "button-click" event corresponding to a user RELEASING the first user-actuatable adjustment device 144B). The number of pulses generated by the first pulse generator circuit 510 responsive to detecting a transition from the second state to the first state may be the same or different than the number of pulses generated responsive to detecting a transition from the first state to the second state and may include any number of pulses such as: 2 or more pulses; 5 or more pulses; or 10 or more pulses. Where the second signal generated by the first pulse generator circuit 510 includes multiple pulses, each pulse in the second signal may be temporally separated from the other pulses in the second signal by a duration of about 100 milliseconds (mS) or less; about 150 mS or less; about 200 mS or less; about 300 mS or less; or about 400 mS or less.

In at least some instances, the second signal generated by the first pulse generator circuit 510 can include two pulses, each pulse consisting of a momentary or similar transitory electrical circuit including resistive device 516 for a defined second duration between the audio-input circuit 328 and ground 320. The second duration can be about 100 milliseconds (mS) or less; about 150 mS or less; about 200 mS or less; about 300 mS or less; or about 400 mS or less. The second signal generated by the first pulse generator circuit 510 is detectible by the operating system 230 or application 240 executed by the portable electronic device 110. In at least some instances, responsive to receipt of the second signal from the first pulse generator circuit 510 the operating system 230 can send a notification (e.g., an interrupt or similar) indicative of the received second signal to a push-to-talk application 240 executing on the portable electronic device 110. Responsive to the arrival of the second signal notification from the operating system 230, the application 240 can transition a first feature of the push-to-talk service from the second state (e.g., ACTIVE state) to the first state (e.g., STANDBY).

The second pulse generator circuit 520 can generate a first signal including a number of pulses in response to detecting a transition in input from the second user-actuatable adjustment device circuit 522 to the second user-actuatable adjustment device circuit 524 corresponding to a user actuating the second user-actuatable adjustment device 144C from the first state to the second state (e.g., a first "button-click" event corresponding to a user DEPRESSING the second user-actuatable adjustment device 144C). The number of pulses generated by the second pulse generator circuit 520 responsive to detecting a transition of the second user-actuatable adjustment device 144C from the first state to the second state can include any number of pulses such as: one or more pulses; 5 or more pulses; or 10 or more pulses. Where the first signal generated by the second pulse generator circuit 520 includes multiple pulses, each pulse in the first signal may be temporally separated from the other pulses in the second signal by a duration of about 100 milliseconds (mS) or less; about 150 mS or less; about 200 mS or less; about 300 mS or less; or about 400 mS or less.

In at least some instances, the first signal generated by the second pulse generator circuit 520 can include a single pulse consisting of a momentary or similar transitory electrical circuit including resistive device 526 of a defined first duration between the audio-input circuit 328 and ground 320. The first duration can be about 100 milliseconds (mS) or less; about 150 mS or less; about 200 mS or less; about 300 mS or less; or about 400 mS or less. The first signal generated by the second pulse generator circuit 520 is detectible by the operating system 230 or application 240 executed by the portable electronic device 110. In at least some instances, responsive to receipt of the first signal from the second pulse generator circuit 520 in the push-to-talk headset 130, the operating system 230 can send a notification (e.g., an interrupt or similar) indicative of the received first signal to a push-to-talk application 240 executing on the portable electronic device 110. Responsive to the arrival of the first signal notification from the operating system 230, the push-to-talk application 240 can transition a second feature of the push-to-talk application 240 from a first state (e.g., MODE OFF) to a second state (e.g., MODE ON).

The second pulse generator circuit 520 can generate a second signal including a number of pulses in response to detecting a transition in input from the second user-actuatable adjustment device circuit 524 to the first user-actuatable adjustment device circuit 522 corresponding to a user actuating the second user-actuatable adjustment device 144C from the second state to the first state (e.g., a "button-click" event corresponding to a user RELEASING the second user-actuatable adjustment device 144C). The number of pulses generated by the second pulse generator circuit 520 responsive to detecting a transition from the second state to the first state may be the same or different than the number of pulses generated by the second pulse generator circuit 520 responsive to detecting a transition from the first state to the second state and may include any number of pulses such as: 2 or more pulses; 5 or more pulses; or 10 or more pulses. Where the second signal generated by the second pulse generator circuit 520 includes multiple pulses, each pulse in the second signal may be temporally separated from the other pulses in the second signal by a duration of about 100 milliseconds (mS) or less; about 150 mS or less; about 200 mS or less; about 300 mS or less; or about 400 mS or less.

In at least some instances, the second signal generated by the second pulse generator circuit 520 can include two pulses, each pulse consisting of a momentary or similar transitory electrical circuit including the second impedance 526 of a defined second duration between the audio-input circuit 328 and ground 320. The second duration can be about 100 milliseconds (mS) or less; about 150 mS or less; about 200 mS or less; about 300 mS or less; or about 400 mS or less. The second signal generated by the second pulse generator circuit 520 is detectible by the operating system 230 or application 240 executed by the portable electronic device 110. In at least some instances, responsive to receipt of the second signal from the second pulse generator circuit 520 the operating system 230 can send a notification (e.g., an interrupt or similar) indicative of the received second signal to a push-to-talk application 240 executing on the portable electronic device 110. Responsive to the arrival of the second signal notification from the operating system 230, the application 240 can transition a first feature of the push-to-talk service from the second state (e.g., MODE ON) to the first state (e.g., MODE OFF).

Figure 6:
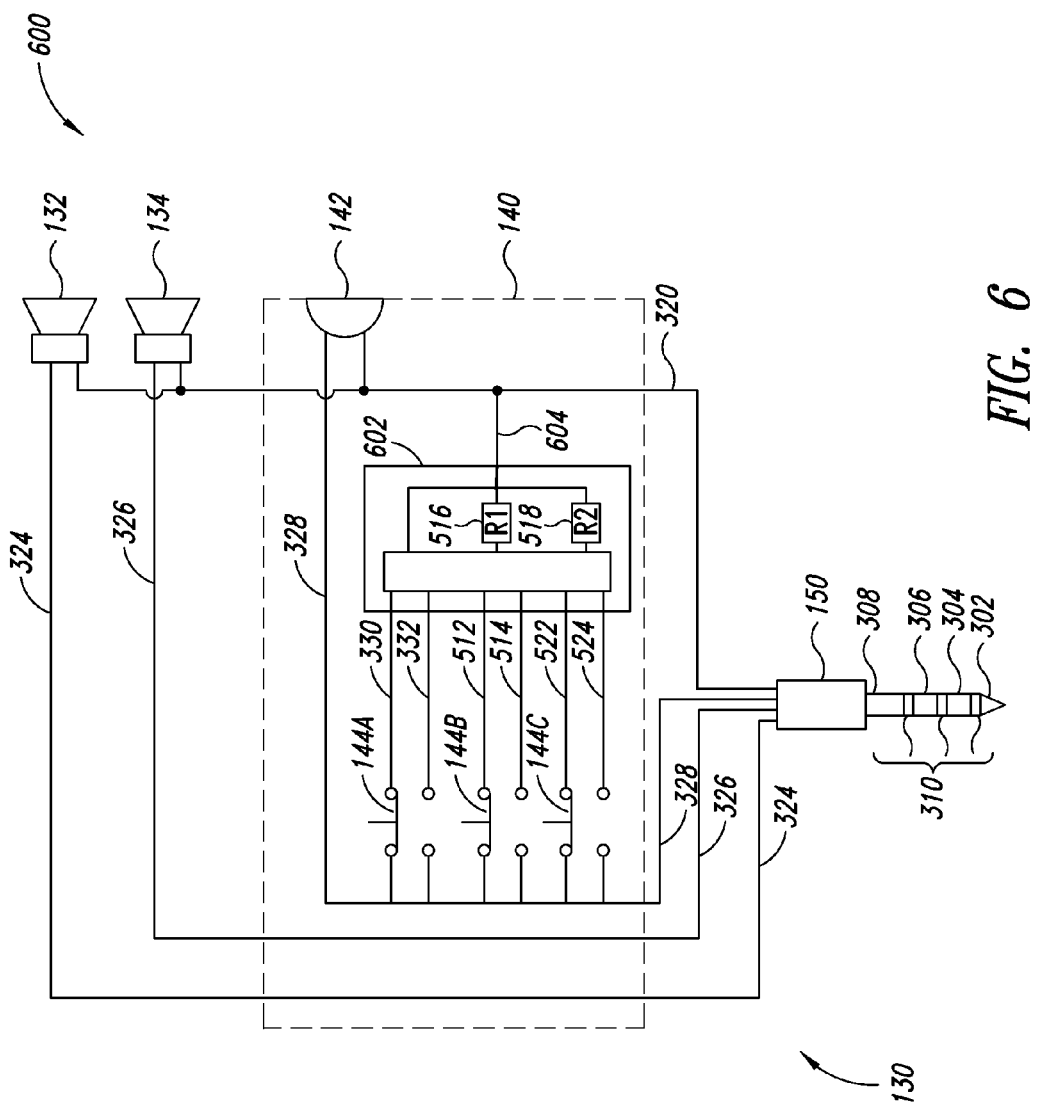
FIG. 6 is a schematic diagram of a push-to-talk headset system including a multi-channel pulse generation circuit and at least three user actuatable input devices, switches or buttons coupled to the multi-channel pulse generation circuit, according to one illustrated embodiment.

FIG. 6 shows an alternate tip-ring-ring-sleeve headset 130 that includes a single, multi-channel, pulse generation circuit 602 having only a single output 604, according to one or more embodiments. The multi-channel pulse generation circuit 602 provides a number of input channels. In at least some instances, the multi-channel pulse generation circuit may incorporate the first impedance 516 and the second impedance 526 as discussed in detail above with respect to FIG. 5. The multi-channel pulse generation circuit 602 can include three input channels, each input channel corresponding to the push-to-talk switch 144A, the first user-actuatable adjustment device 144B, and the second user-actuatable adjustment device 144C, respectively. Within the multi-channel pulse generation circuit 602, the low impedance push-to-talk switch 144A circuit, the first user-actuatable adjustment device 144B circuit containing the first impedance 516, and the second user-actuatable adjustment device 144C circuit containing the second impedance 526 may be electrically communicably coupled to the output 604. Functionally and operationally, the multi-channel pulse generator circuit 602 is similar to the pulse generator circuit 220, the first pulse generator circuit 510 and the second pulse generator circuit 520.

Although described in the context of portable electronic devices, the systems, apparatus and methods described herein are not limited to portable electronic devices and are equally applicable to any headset system using any size tip-ring-ring-sleeve connector. Example, non-limiting headset systems include, aviation headset systems, gaming headset systems, commercial headset systems, first responder and emergency services headset systems, military headset systems, broadcast headset systems, and the like.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An audio device, comprising:
   a connector plug including a tip, a first ring, a second ring, and a sleeve, the tip, the first ring, the second ring, and the sleeve are each electrically conductive and electrically isolated from one another;
   a microphone having an output electrically coupled, via an internal microphone connector conductor, to a particular connector plug portion selected from the tip, the first ring, the second ring, and the sleeve and configured to convert audio input to an analog or digital electrical signal representative of the audio input and provide the analog or digital electrical signal to another device via the internal microphone connector conductor and the particular connector plug portion;
   a user-actuatable push-to-talk (PTT) switch electrically coupled between the internal microphone connector conductor and ground, and transitionable between at least a first PTT not enabled mode state in which the microphone is not enabled and a second PTT enabled mode state in which the microphone is enabled and audio captured at the microphone is output via the particular connector plug portion to be transmitted or broadcast over a half or full-duplex communication channel;
   wherein, responsive to a transition from the first state to the second state, the PTT switch provides a first number of pulses, each pulse comprising a low impedance electrical connection across the internal microphone connector conductor for at least a first duration and each pulse separated from another pulse by a high impedance electrical connection across the internal microphone connector conductor for at least a second duration; and
   wherein, responsive to a transition from the second state to the first state, the PTT switch provides a second number of pulses across the internal microphone connector conductor.

2. The audio device of claim 1, further comprising:
   a first speaker electrically coupled to a second particular connector plug portion selected from the tip, the first ring, the second ring, and the sleeve different from the particular connector plug portion; and
   a second speaker electrically coupled to a third particular connector plug portion selected from the tip, the first ring, the second ring, and the sleeve different from the particular connector plug portion and the second particular connector plug portion.

3. The audio device of claim 2, wherein the first and the second speakers are part of a headset.

4. The audio device of claim 1, wherein the PTT switch includes at least one set of momentary, normally closed, contacts and at least one set of momentary, normally open, contacts.

5. The audio device of claim 1, wherein the PTT switch device is biased to the first state.

6. The audio device of claim 1, further comprising:
   a mechanical lock selectively operable to retain the PTT switch in the second state.

7. The audio device of claim 1:
   wherein the first duration is 200 milliseconds or more; and
   wherein the second duration is 200 milliseconds or more.

8. The audio device of claim 1:
   wherein the first number of pulses consists of one pulse; and
   wherein the second number of pulses consists of two pulses.

9. The audio device of claim 1, wherein the connector comprises either a 3.5 mm diameter tip-ring-ring-sleeve connector or a 2.5 mm diameter tip-ring-ring-sleeve connector.

10. The audio device of claim 1, wherein the low impedance electrical connection comprises an electrical short circuit to ground.

11. The audio device of claim 1, further comprising:
    a first adjustment device transitionable between at least a first state and a second state communicably coupled between the ground and the internal microphone connector conductor;
    wherein, responsive to a transition from the first state to the second state, the first adjustment device provides the first number of pulses, each pulse comprising an electrical connection having a first impedance across the internal microphone connector conductor for at least the first duration and each pulse separated from another pulse by the high impedance electrical connection across the internal microphone connector conductor for at least the second duration; and
    wherein, responsive to a transition from the second state to the first state, the first adjustment device provides the second number of pulses.

12. The audio device of claim 11, further comprising a housing at least partially enclosing the microphone, the PTT switch, and the first adjustment device.

13. The audio device of claim 11, wherein the first impedance is less than 400 ohms.

14. The audio device of claim 11, further comprising:
    a second adjustment device transitionable between at least a first state and a second state and communicably coupled between the ground and the internal microphone connector conductor;
    wherein, responsive to a transition from the first state to the second state, the second adjustment device provides the first number of pulses, each pulse comprising an electrical connection having a second impedance across the internal microphone connector conductor for at least the first duration and each pulse separated from another pulse by the high impedance electrical connection across the internal microphone connector conductor for at least the second duration; and
    wherein, responsive to a transition from the second state to the first state, the second adjustment device provides the second number of pulses.

15. The audio device of claim 14, further comprising a housing at least partially enclosing the microphone, the push-to-talk switch, the first adjustment device, and the second adjustment device.

16. The audio device of claim 14, wherein the second impedance is more than 400 ohms.

17. The audio device of claim 14, wherein the first and second adjustment devices are biased to the first state.

18. An audio method, comprising:
coupling, via an internal microphone connector conductor, a microphone output to a particular connector plug portion selected from a tip, a first ring, a second ring, and a sleeve of a tip-ring-ring-sleeve connector plug, for converting audio input to the microphone to an analog or digital electrical signal representative of the audio input and providing the analog or digital electrical signal to another device via the internal microphone connector conductor and the particular connector plug portion; and
coupling a user-actuatable push-to-talk switch between the internal microphone connector conductor and ground, the PTT switch selectively operable to provide a first number of pulses responsive to a transition of the push-to-talk (PTT) device from a first PTT not enabled mode state in which the microphone is not enabled to a second PTT enabled mode state in which the microphone is enabled and audio captured at the microphone is output via the particular connector plug portion to be transmitted or broadcast over a half or full-duplex communication channel by providing for each of the first number of pulses a low impedance electrical connection across the internal microphone connector conductor for at least a first duration and selectively operable to provide a second number of pulses responsive to a transition of the PTT switch from the second PTT enabled mode state to the first PTT not enabled mode state by providing between each of the first number of pulses a high impedance electrical connection across the internal microphone connector conductor for at least a second duration.

19. The audio method of claim 18, wherein providing for each of the first number of pulses a low impedance electrical connection across the internal microphone connector conductor at least a first duration comprises:
providing for each of the first number of pulses an electrical short circuit across the second ring conductor for at least 200 milliseconds (mS).

20. The audio method of claim 18, wherein providing between each of the first number of pulses a high impedance electrical connection across the internal microphone connector conductor for at least a second duration comprises:
providing between each of the first number of pulses a high impedance electrical connection across the internal microphone connector conductor for at least 200 milliseconds (mS).

21. The audio method of claim 18, further comprising:
providing for the first number of pulses at least one pulse; and
providing for the second number of pulses at least two pulses.

22. The audio method of claim 18, further comprising:
coupling a first adjustment device transitionable between at least a first state and a second state between the ground and the internal microphone connector conductor, the first adjustment device selectively operable to provide the first number of pulses responsive to a transition of the first adjustment device from a first state to a second state and selectively operable to provide the second number of pulses responsive to a transition of the first adjustment device from the second state to the first state.

23. The audio method of claim 22, wherein coupling the first adjustment device between the ground and the internal microphone connector conductor, the first adjustment device selectively operable to provide a first number of pulses responsive to a transition of the first adjustment device from a first state to a second state and selectively operable to provide a second number of pulses responsive to a transition of the first adjustment device from the second state to the first state comprises:
providing for each of the first number of pulses an electrical connection across the internal microphone connector conductor having an impedance of less than 400 ohms for at least 200 milliseconds (mS); and
providing between each of the first number of pulses a high impedance electrical connection across the internal microphone connector conductor for at least 200 milliseconds (mS).

24. The audio method of claim 22, further comprising:
coupling a second adjustment device transitionable between at least a first state and a second state between the ground and the internal microphone connector conductor, the second adjustment device selectively operable to provide the first number of pulses responsive to a transition of the second adjustment device from a first state to a second state and selectively operable to provide the second number of pulses responsive to a transition of the second adjustment device from the second state to the first state.

25. The audio method of claim 22, wherein coupling the second adjustment device transitionable between at least a first state and a second state between the ground and the internal microphone connector conductor, the second adjustment device selectively operable to provide the first number of pulses responsive to a transition of the second adjustment device from a first state to a second state and selectively operable to provide the second number of pulses responsive to a transition of the second adjustment device from the second state to the first state comprises:
providing for each of the first number of pulses an electrical connection across the internal microphone connector conductor having an impedance of more than 400 ohms for at least the 200 milliseconds (mS); and
providing between each of the first number of pulses a high impedance electrical connection across the internal microphone connector conductor for at least 200 milliseconds (mS).

* * * * *